United States Patent [19]
Krabill

[11] Patent Number: 5,658,632
[45] Date of Patent: Aug. 19, 1997

[54] MASKING DEVICE

[75] Inventor: Don L. Krabill, Elkhart, Ind.

[73] Assignee: Geocel Corporation, Elkhart, Ind.

[21] Appl. No.: 447,407

[22] Filed: May 23, 1995

[51] Int. Cl.$^6$ .................................................. B32B 3/10
[52] U.S. Cl. ........................ 428/43; 428/57; 428/77; 428/194; 428/212; 118/505
[58] Field of Search ............................ 428/43, 77, 194, 428/212, 57; 118/505, 504

[56] References Cited

U.S. PATENT DOCUMENTS

| Re. 19,128 | 4/1934 | Drew | 91/68 |
|---|---|---|---|
| 1,032,026 | 7/1912 | Roden | 428/43 |
| 1,827,636 | 10/1931 | Ames | 428/43 |
| 2,657,795 | 11/1953 | Calabrese | 206/59 |
| 2,808,358 | 10/1957 | Masse | 154/118 |
| 3,143,208 | 8/1964 | Sizemore | 428/43 |
| 3,873,018 | 3/1975 | Donnay | 156/86 |
| 4,024,837 | 5/1977 | Snyder | 118/505 |
| 4,033,803 | 7/1977 | Coder | 156/71 |
| 4,582,737 | 4/1986 | Torgerson et al. | 428/57 |

Primary Examiner—Alexander Thomas
Attorney, Agent, or Firm—Barnes & Thornburg

[57] ABSTRACT

A masking device for caulking, painting and similar operations includes a strip of material with multiple perforations. One side of the device may be provided with adhesive over desired areas. The adhesive may vary in strength along various regions of the surface. In use, the device is placed over the area to be caulked, painted or similarly treated. A desired portion of the masking device is peeled back and the desired operation is performed. The remaining portions of the masking device are then removed. In another embodiment of the invention, the device utilizes multiple strips, at least one of which partially overlaps another.

30 Claims, 1 Drawing Sheet

MASKING DEVICE

BACKGROUND AND SUMMARY OF THE INVENTION

The present invention relates to masking devices for caulking, painting and similar operations and, in particular, relates to a masking device having at least one removable strip of material.

When painting, caulking or performing similar tasks, it may be desirable to apply the caulk or other material to a limited area. To that end, various masking devices have been developed. Typically, such devices are used to define the area to which the caulk or other material is to be applied. As the caulk or material is applied, it may be distributed over the desired area as well as all or part of the masking device. The masking device is then removed, with the excess caulk or other material, leaving behind the properly coated area.

Accordingly, it is an object of the present invention to provide a masking device.

Another object of the present invention is to provide a masking device that is effective and easy to use.

Yet another object of the present invention is to provide a masking device that may be utilized in various applications.

These and other objects of the present invention are attained by the provision of a masking device having a substantially planar strip of material. A first perforation is formed along the length of the strip. Second and third perforations are formed parallel to the first perforation and are located between the first perforation and the first edge of the strip and the first perforation and the second edge of the strip, respectively. The device may have adhesive applied to one side thereof. The adhesive may be of constant or varying strength and may cover all or part of one side of the device. A sight line may be provided for lining up the device.

According to another embodiment of the present invention, the masking device has first and second strip members, each of which have first and second edges and first and second surfaces. A third strip member overlaps the first surface the first and second strip members. Adhesive is applied to the second surface of the first and second strip members. The adhesive may vary in strength across the surface. Adhesive is also applied in the region of overlap between the first, second and third strip members.

According to another embodiment of the present invention, a masking device includes a substantially planar strip of translucent material having first second edges. Two parallel perforations are formed along the length of the strip. A sight line is located the first and second perforations.

Other objects, advantages and novel features of the present invention will be apparent form the drawings and the following detailed description of the preferred embodiments.

DETAILED DESCRIPTION OF THE PREFERRED EMBODIMENTS

Figure 1:
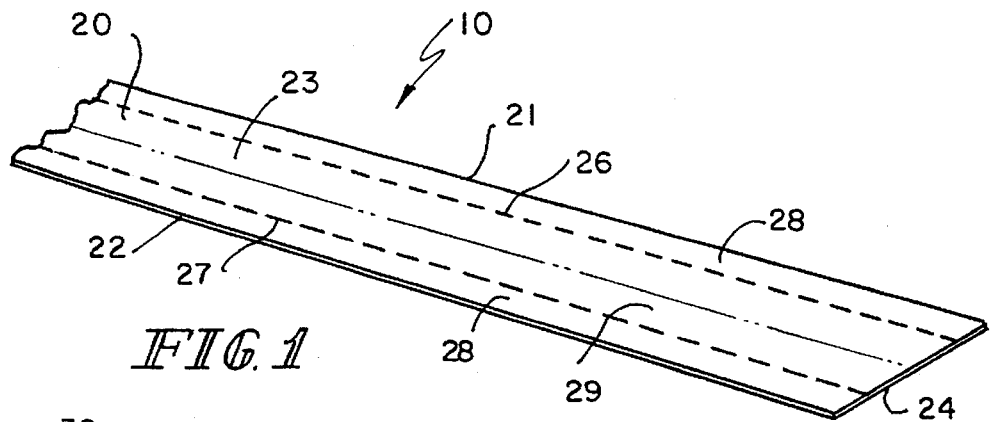
FIG. 1 is a perspective view of a masking device according to the present invention.

FIG. 1 is a perspective view of a masking device 10 according to the present invention. Device 10 is a generally planar strip of material 20 having a first edge 21, a second edge 22, a top surface 23 and a bottom surface 24. Strip 20 is preferably a translucent material, however, opaque material may also be used. If translucent, a sight line 25 may be disposed along the length thereof. Sight line 25 is preferably disposed along the central axis of strip 20, however, it may be located in any desired position. A first perforation 26 is located between sight line 25 and first edge 21. A second perforation 27 is located between sight line 25 and second edge 22. In this manner, the perforations divide strip 20 into a pair of outer strips 28 and an inner strip 29.

Figure 2:
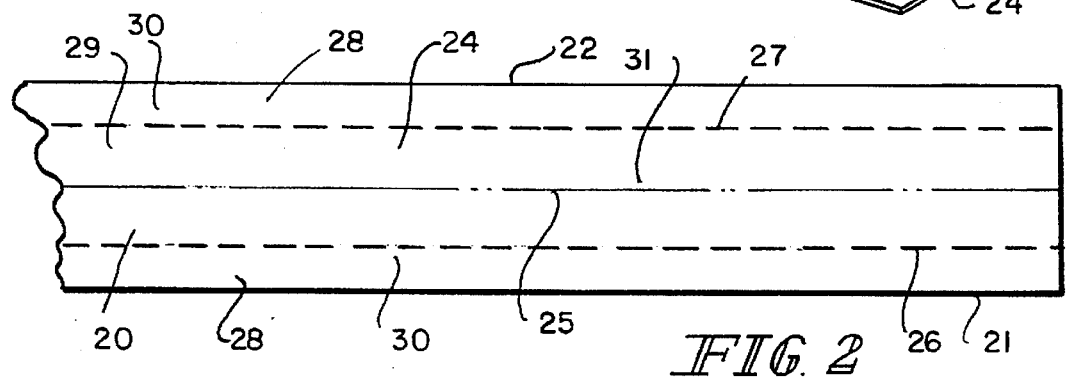
FIG. 2 is a bottom plan view of the masking device shown in FIG. 1.

Turning to FIG. 2, bottom surface 24 of outer strips 28 is preferably coated with an adhesive 30. Adhesive 30 may vary in strength between first edge 21 and first perforation 26 and between second edge 22 and second perforation 27. If so, it is preferred that the strength of adhesive 30 be greater near first perforation 26 and second perforation 27 than near first edge 21 and second edge 22. Bottom surface 24 of inner strip 29 may, if desired, also be provided with adhesive 31. If so, it is preferable that adhesive 31 be relatively weak.

It is anticipated that masking device 10 will be provided in roll, much like tape, with bottom surface 24 resting on the top surface 23 while rolled. Alternatively, a backing paper (not shown) could be provided adjacent bottom surface 24 such that it would also be adjacent top surface 23 when device 10 is in rolled form.

To use device 10 for caulking around the base of a bathtub, for example, the desired length of device 10 is unrolled and cut. If a backing paper is provided, the backing paper is then removed. Device 10 is then positioned along the bottom of the tub such that sight line 25 coincides with the center of the joint between the tub and the floor. Device 10 is then pressed against the side of the tub and the floor such that outer strips 28 are adhered to the side of the tub and the floor, respectively. If adhesive 31 is utilized on center strip 29, a portion of it will adhere to the side of the tub and another portion will adhere to the floor. One end of inner strip 29 is then grasped and peeled back such that device 10 tears along first perforation 26 and second perforation 27. In this manner, center strip 29 is completely removed and one outer strip 28 remains adhered to the tub and the other outer strip 28 remains adhered to the floor. As noted above, it is not necessary to include adhesive 31 because center strip 29 is to be removed. However, if such adhesive is applied, it should be relatively light such that strip 29 may be easily removed. If an adhesive 30 of varying strength is utilized on outer strips 28, it may be desirable to have adhesive 30 stronger near first perforation 26 and second perforation 27 so as to resist lifting of outer strips 28 as perforations 26 and 27 are torn and inner strip 29 is removed. Once inner strip 29 is removed, caulk may be applied in the opening that remains between outer strips 28. Outer strips 28 may then be removed. Any caulk that was inadvertently applied outside the opening and onto outer strips 28 will be removed with outer strips 28. In this manner, a clean caulk joint is provided. Obviously, masking device 10 may also be utilized with paints, varnishes, etc.

Figure 3:
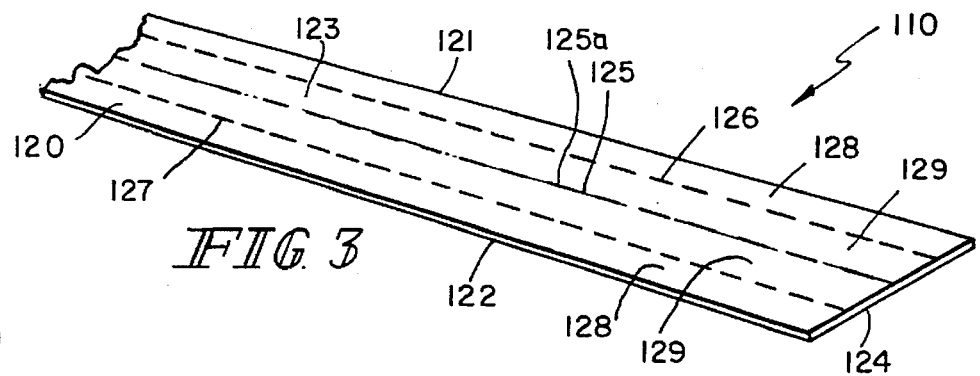
FIG. 3 is a perspective view of a second embodiment of a masking device according to the present invention.

An alternative embodiment of the present invention is shown in FIG. 3. In this embodiment, like elements are indicated by the same numerical designation preceded by the number "1. In this embodiment, a third perforation 125a is coincident with sight line 125. In this manner, strip 120 is divided into two outer strips 128 and two inner strips 129. Thus, one or both inner strips 129 (a) may be removed, as desired. Bottom surface 124 may be coated with adhesive, as desired.

Figure 4:
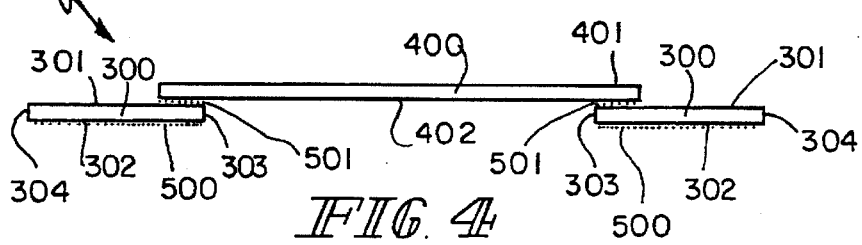
FIG. 4 is an end view of a third embodiment of a masking device according to the present invention.

Another embodiment of the present invention is shown in FIG. 4. This embodiment includes a pair of outer strips 300 and an inner strip 400. Each outer strip 300 includes a top surface 301, a bottom surface 302, an inner edge 303 and an outer 304. Similarly, inner strip 400 includes a top surface 401, a bottom surface 402, a first edge 403 and a second edge 404. Adhesive 500 may be applied to bottom surface 302 of each outer strip 300. If desired, the strength of adhesive 500 may vary along bottom surface 302 of outer strips 300. If so, it is preferred that adhesive 500 be stronger near inner edges 303 than outer edges 304. Inner strip 400 overlaps outer strips 300. Adhesive 501 is applied to bottom surface 402 of inner strip 400 and top surface 301 of outer strips 300 in the area of overlap. As with the prior embodiments, it is anticipated that the embodiment shown in FIG. 4 will also be provided in rolled form. Accordingly, it may be rolled with or without a backing paper.

In use, masking device 200 is positioned as desired over the joint to be caulked, for example. One end of inner strip 400 is then lifted and inner strip 400 is peeled back off of outer strips 300, thereby leaving a space for caulking, painting, etc. Outer strips 300 are subsequently removed as previously described.

Although the invention has been shown and described in detail, the same is by way of illustration and example only and is not to be taken as a limitation. Various changes may be made to the described embodiments without departing from the scope of the invention. Accordingly, the scope of the invention is to be limited only by the appended claims.

What is claimed is:

1. A masking device, comprising:

a substantially planar strip of material having a first edge and a second edge;

a first perforation along the length of said strip;

a second perforation parallel to said first perforation and disposed between said first perforation and said second edge;

a third perforation parallel to said first perforation and disposed between said first and second perforations; and adhesive on a surface of said strip between said first perforation and said first edge, said adhesive covering less than all of said surface of said strip.

2. The masking device according to claim 1, wherein said adhesive varies in strength between said first perforation and said first edge.

3. The masking device according to claim 2, wherein said adhesive is stronger adjacent said first perforation than adjacent said first edge.

4. The masking device according to claim 1, further comprising a sight line printed on said planar strip along the length thereof.

5. The masking device according to claim 4, wherein said sight line is coincident with one of said perforations.

6. The masking device according to claim 1, wherein said third perforation divides said strip into two strips of equal width.

7. The masking device according to claim 1, wherein said material is clear.

8. A masking device, comprising:

a first strip member having first and second edges and first and second surfaces;

a second strip member having first and second edges and first and second surfaces;

a third strip member overlapping said first surface of said first strip member and said first surface of said second strip member;

adhesive on said second surface of said first strip member, said adhesive varying in strength from said first edge to said second edge;

adhesive on said second surface of said second strip member, said adhesive varying in strength from said first edge to said second edge;

adhesive disposed in the region of overlap between said first and third strip members; and adhesive disposed in the region of overlap between said second and third strip members.

9. The masking device according to claim 8, wherein said adhesive in the region of overlap between said first and third strip members is relatively weaker than the adhesive disposed on said second surface of said first strip member.

10. A masking device, comprising:

a substantially planar strip of translucent material having a first edge and a second edge;

a first perforation along the length of said strip;

a second perforation parallel to said first perforation; and a sight line disposed between said first and said second perforations.

11. The masking device according to claim 10, further comprising adhesive on said strip between said first perforation and said first edge.

12. The masking device according to claim 11, further comprising adhesive on said strip between said second perforation and said second edge.

13. The masking device according to claim 11, further comprising adhesive on said strip between said first and second perforations.

14. The masking device according to claim 13, wherein said adhesive between said first and second perforations is relatively weaker than said adhesive between said first perforation and said first edge.

15. The masking device according to claim 11, wherein said first adhesive varies in strength between said first perforation and said first edge.

16. The masking device according to claim 15, wherein said first adhesive is stronger adjacent said first perforation than adjacent said first edge.

17. The masking device according to claim 16, wherein said adhesive varies in strength between said first perforation and said first edge and between said second perforation and said second edge.

18. The masking device according to claim 17, wherein said adhesive is relatively stronger adjacent said first and second perforations than adjacent said first and second edges.

19. A masking device, comprising:

a substantially planar strip of material having a first edge and a second edge;

a first perforation disposed between said first and second edges;

a second perforation disposed between said first perforation and said second edge;

a third perforation disposed between said first and second perforations; and adhesive on a surface of said strip between said first perforation and said first edge, said adhesive covering less than the entire area of said surface.

20. The masking device according to claim 19, wherein said adhesive varies in strength between said first perforation and said first edge.

21. The masking device according to claim 20, wherein said adhesive is stronger adjacent said first perforation than adjacent said first edge.

22. The masking device according to claim 19, further comprising a sight line printed on said planar strip.

23. The masking device according to claim 22, wherein said sight line is coincident with one of said perforations.

24. The masking device according to claim 19, wherein said material is clear.

25. A masking device, comprising:

a substantially planar strip of material having a first edge and a second edge;

a first perforation along the length of said strip;

a second perforation parallel to said first perforation and disposed between said first perforation and said second edge;

a third perforation parallel to said first perforation and disposed between said first and second perforations; and adhesive on said strip only between said first perforation and said first edge and said second perforation and said second edge.

26. The masking device according to claim 25, wherein said adhesive varies in strength between said first perforation and said first edge and between said second perforation and said second edge.

27. The masking device according to claim 26, wherein said adhesive material is stronger adjacent said first and second perforations than adjacent said first and second edges.

28. A masking device, comprising:

a substantially planar strip of material having a first edge and a second edge;

a first perforation disposed between said first and second edges;

a second perforation disposed between said first perforation and said second edge;

a third perforation disposed between said first and second perforations and said first edge; and adhesive along said strip only between said first perforation and said first edge and said second perforation and said second edge.

29. The masking device according to claim 28, wherein said adhesive varies in strength between said first perforation and said first edge and between said second perforation and said second edge.

30. The masking device according to claim 29, wherein said adhesive material is stronger adjacent said first and second perforations than adjacent said first and second edges.

* * * * *